United States Patent
Agarwal et al.

(10) Patent No.: US 11,017,344 B2
(45) Date of Patent: May 25, 2021

(54) METHOD AND APPARATUS FOR PREDICTING DEPLETION OF DEIONIZATION TANKS AND OPTIMIZING DELIVERY SCHEDULES

(71) Applicant: Ecolab USA Inc., St. Paul, MN (US)

(72) Inventors: Ashish Agarwal, Winfield, IL (US); Kenneth R. Hecimovich, Chesterton, IN (US); Raymond H. Perdue, Orland Park, IL (US); David A. Ambrose, St. Charles, IL (US); Chen Yao, Naperville, IL (US); Michael K. Antenore, Geneva, IL (US)

(73) Assignee: Ecolab USA Inc., Saint Paul, MN (US)

( * ) Notice: Subject to any disclaimer, the term of this patent is extended or adjusted under 35 U.S.C. 154(b) by 639 days.

(21) Appl. No.: 15/262,832

(22) Filed: Sep. 12, 2016

(65) Prior Publication Data

US 2018/0075399 A1     Mar. 15, 2018

(51) Int. Cl.
*G06Q 10/08* (2012.01)
*G01F 1/00* (2006.01)
(Continued)

(52) U.S. Cl.
CPC ............ *G06Q 10/083* (2013.01); *C02F 1/42* (2013.01); *G01F 1/00* (2013.01); *G01F 23/0076* (2013.01);
(Continued)

(58) Field of Classification Search
None
See application file for complete search history.

(56) References Cited

U.S. PATENT DOCUMENTS

| 2,628,191 A | 2/1953 | Sard |
| 3,334,044 A | 8/1967 | Satterlee |

(Continued)

FOREIGN PATENT DOCUMENTS

| CN | 101249461 B | 6/2010 |
| CN | 105277544 A | 1/2016 |

(Continued)

OTHER PUBLICATIONS

Xu, X., Pan, L., Liu, Y., Lu, T., Sun, Z., & Chua, D. H. (2015). Facile synthesis of novel graphene sponge for high performance capacitive deionization. Scientific Reports, 5(1). doi:10.1038/srep08458 (Year: 2015).*

(Continued)

*Primary Examiner* — Matthew S Gart
*Assistant Examiner* — Tiera J Fletcher
(74) *Attorney, Agent, or Firm* — Fredikson & Byron, P.A.

(57) ABSTRACT

Systems for analyzing and monitoring deionization tank system performance in a fluid flow system and generating delivery schedules for servicing deionization tanks can include a conductivity sensor and a fluid flow meter. Data regarding the amount and conductivity of fluid flowing through the deionization tank system can be used to predict a remaining capacity of the deionization tank system. A central server can determine the remaining capacity of deionization tank systems at a plurality of service locations. The central server can generate a delivery schedule for servicing deionization tank systems at each of the plurality of service locations based on the determined remaining capacities. Other parameters can be used to optimize efficiency of the delivery schedule while meeting the needs of each of the service locations.

20 Claims, 5 Drawing Sheets

(51) Int. Cl.
*G01F 23/00* (2006.01)
*C02F 1/42* (2006.01)
*G06Q 10/10* (2012.01)

(52) U.S. Cl.
CPC ...... *G06Q 10/1097* (2013.01); *C02F 2209/05* (2013.01); *C02F 2209/40* (2013.01); *C02F 2209/44* (2013.01); *C02F 2303/14* (2013.01); *G01F 1/007* (2013.01)

(56) References Cited

U.S. PATENT DOCUMENTS

| | | | |
|---|---|---|---|
| 3,705,477 | A | 12/1972 | Longo et al. |
| 3,846,257 | A | 11/1974 | Frant |
| 3,928,200 | A | 12/1975 | Calmon et al. |
| 3,964,999 | A | 6/1976 | Chisdes |
| 5,022,994 | A * | 6/1991 | Avery ............... C02F 1/42 137/624.12 |
| 5,069,779 | A | 12/1991 | Brown et al. |
| 6,783,684 | B2 | 8/2004 | Teel, Jr. |
| 7,100,427 | B2 | 9/2006 | Kahn et al. |
| 7,713,420 | B2 | 5/2010 | Chu et al. |
| 7,920,983 | B1 | 4/2011 | Peleg et al. |
| 8,148,594 | B2 | 4/2012 | Denton et al. |
| 8,518,262 | B2 | 8/2013 | Watkins et al. |
| 9,044,747 | B2 | 6/2015 | Carson et al. |
| 2003/0056646 | A1 | 3/2003 | Tanaka et al. |
| 2003/0094418 | A1* | 5/2003 | Barlow .............. B01J 47/012 210/681 |
| 2004/0117135 | A1 | 6/2004 | Rogers et al. |
| 2004/0204870 | A1 | 10/2004 | Schimnowski et al. |
| 2004/0220844 | A1* | 11/2004 | Sanville ............ G06Q 10/0631 705/7.26 |
| 2010/0133194 | A1 | 6/2010 | Johnson et al. |
| 2011/0180477 | A1* | 7/2011 | Ganzi ................. B01D 61/44 210/638 |
| 2013/0299001 | A1* | 11/2013 | Gillette ............... H02J 50/00 137/2 |
| 2014/0260672 | A1 | 9/2014 | Tokhtuev et al. |
| 2014/0373926 | A1 | 12/2014 | Jha et al. |
| 2015/0059468 | A1* | 3/2015 | Humphrey ......... G01F 23/0076 73/290 R |
| 2015/0212024 | A1 | 7/2015 | Banks |
| 2015/0329384 | A1 | 11/2015 | Astle |
| 2015/0374895 | A1* | 12/2015 | Friederichs ........ A61M 1/1664 210/87 |
| 2016/0131608 | A1 | 5/2016 | Howes, Jr. |
| 2016/0202709 | A1 | 7/2016 | Newman, Jr. |
| 2017/0155703 | A1* | 6/2017 | Hao ................... H04L 67/12 |

FOREIGN PATENT DOCUMENTS

| | | | |
|---|---|---|---|
| DE | 2953143 A1 | 10/1980 | |
| DE | 2928123 A1 | 1/1981 | |
| DE | 102011003326 A1 | 8/2012 | |
| EP | 1968151 A2 * | 9/2008 | ......... H01M 10/3909 |
| ES | 401567 A1 | 3/1975 | |
| FR | 1454662 A | 2/1966 | |
| FR | 2835824 A1 | 8/2003 | |
| JP | S60172391 A | 9/1985 | |
| JP | H01218680 A | 8/1989 | |
| JP | 2001205265 A | 7/2001 | |
| JP | 2002143694 A | 5/2002 | |
| JP | 2004101065 A | 4/2004 | |
| JP | 2006030146 A | 2/2006 | |
| JP | 4292087 B2 | 7/2009 | |
| JP | 2009240959 A | 10/2009 | |
| JP | 2012154634 A | 8/2012 | |
| JP | 2013208566 A | 10/2013 | |
| KR | 20040079036 A | 9/2004 | |
| KR | 20130112346 A | 10/2013 | |
| SU | 1578618 A1 | 7/1990 | |
| WO | 9629578 A1 | 9/1996 | |
| WO | 2005096771 A2 | 10/2005 | |
| WO | 2011051949 A1 | 5/2011 | |

OTHER PUBLICATIONS

Sozinov et al., "Control for Exhaust of Ion-Exchange Filters of Water Treatment Installations at Thermal Power Plants," Reliability and Performance Improvement of Thermal Power Plants, Inter-university collection of research papers, Ministry of Tertiary Education of the Russian Soviet Federated Socialistic Republic, Ivanovo State University, 8 pages Russian language document, 4 pages English language abstract.

Balachandran, "Correlation of operating capacity of strong acid cation exchange resin," Institute of Electrical and Electronics Engineers Inc., Dec. 2005, 110 pages.

Blogerman et al., "Monitoring of the ion-exchange ability of second-stage H-type cation exchanger filters," Energetik, vol. 10, 1986, pp. 20-21, Abstract Only.

Clifford et al., "Salt conservation, selectivity reversal and breakthrough detection in ion exchange for nitrate removal," NATO ASI Series, Series E: Applied Sciences, vol. 98, 1985, pp. 102-115, Abstract Only.

Derkasova et al., "Automatic monitoring of the exhaustion of anion-exchange filters of the first phase of water treatment plants," Energetik, vol. 7, 1982, pp. 28-29, Abstract Only.

Germash et al., "Automatic monitoring of the exhaustion of anion exchangers in the first stage in water treatment facilities," Deposited Documents, SPSTL 651 Khp-D81, 7 pages, Abstract Only.

Gilwood, "New technique for control of ion-exchanger end point," Instruments and Automation, vol. 27, 1954, p. 1633, Abstract Only.

Gray, "Monitoring deionization capacity of an ion exchange system," Ultrapure Water, vol. 17, No. 6, Jul./Aug. 2000, pp. 61-64, Abstract Only.

Griffin, "Anion Resin Characteristics and Forecasting of Optimum Replacement Interval," American Water Works Association, vol. 56, No. 5, 1964, pp. 616-620, Abstract Only.

Kuznetsova et al., "Potentiometric indicator of H-cation-exchanger exhaustion," Energetik, vol. 6, 1988, pp. 27-28, Abstract Only.

Larin et al., "Possible use of pH monitoring at water desalination plants," Teploenergetika, vol. 10, 1983, pp. 58-59, Abstract Only.

Mostofin, "Improving the conductometric monitoring of purity of the working medium in energy units of supercritical pressure," Elektricheskie Stantsii, vol. 5, 1974, pp. 78-79, Abstract Only.

Noguchi, "The removal of weakly ionized species by EDI technology," Nippon Kaisui Gakkaishi, vol. 58, No. 2, 2004, pp. 167-173, Abstract Only.

Shkulin et al., "Signalling device to indicate exhaustion of anion-exchange filters," Teploenergetika, vol. 7, 1975, pp. 18-21, Abstract Only.

Smirnov et al., "Determination of the exhaustion of a mixed bed of anion-exchange resins along the column," Plasticheskie Massy, vol. 6, 1965, pp. 67-68, Abstract Only.

Sohn et al., "Prediction model for exhausted point of ion exchange resin column pf moderator purification circuit at Korean CANDU® plant," Journal of Nuclear Science and Technology, vol. 42, No. 9, 2005, pp. 833-838.

Vysotskii, "Monitoring the exhaustion of ion-exchange filters based on the electric conductivity of the ion-exchange layer," Teploenergetika, vol. 9, 1976, pp. 15-17, Abstract Only.

Yang et al., "A neural network for breakthrough prediction in packed bed adsorption," Biotechnology Techniques, vol. 7, No. 2, Feb. 1993, pp. 155-158, Abstract Only.

International Patent Application No. PCT/US2017/051101, International Search Report and Written Opinion dated Dec. 14, 2017, 14 pages.

* cited by examiner

METHOD AND APPARATUS FOR PREDICTING DEPLETION OF DEIONIZATION TANKS AND OPTIMIZING DELIVERY SCHEDULES

BACKGROUND

Deionization (DI) tank systems comprising one or more deionization tanks are commonly used for fluid pretreatment in a variety of fluid flow processes. Some DI tank systems comprise one or more tanks including various combinations of resins that are deployed to filter impurities or other undesired constituents from a process fluid. As the quality of fluid and the rate of fluid consumption dynamically changes, the depletion rate of the resin within this tank is unpredictable. Sensors are available such that they will indicate the depletion of the tank after the fact. For example, a sensor at the output of the deionization tank system can sense properties of the fluid flowing from the deionization tank system toward a use device. The sensor at the output of the deionization tank system can be used to determine that the deionization tank system is no longer sufficiently deionizing the fluid for use with the use device.

For instance, once a deionization tank system has filtered its capacity of grains from the fluid, the deionization tank system becomes exhausted. Once the deionization tank system is exhausted, it becomes ineffective for deionizing the fluid or providing deionized fluid to the use device, and must be serviced or replaced. In some systems, an exhausted deionization tank system can result in a temporarily unusable use device until the deionization tank system is serviced or replaced. This can be costly to the user of the system. Additionally, scheduling a provider to service or replace the deionization tank system after it is determined that the deionization tank system is exhausted can take undesirably long to service.

Additionally, from a deionization tank system servicing perspective, contractual or other obligations with operators of deionization tank systems can require deionization tank system service within a specified time of deionization tank system exhaustion. However, observing exhaustion of the deionization tank system after the fact can place undesirable strain on the servicing entity to meet such commitments and deadlines. This can lead to inefficiencies and excess costs in adequately servicing clients' deionization tank systems.

SUMMARY

Some aspects of this disclosure are directed toward systems and methods for generating delivery schedules for servicing deionization tanks at a plurality of service locations. In some examples, systems can include, at each of the plurality of service locations, a fluid flow system comprising a deionization tank system, a fluid flow meter, and a conductivity sensor. In some such examples, the conductivity sensor is positioned upstream from the deionization tank system and in fluid communication with a fluid inlet of the deionization tank system.

The system can further include a central server in communication with each of the plurality of service locations. The central server can be configured to receive, from each service location, data corresponding to the amount of the conductivity of the fluid flowing through the deionization tank system over time. The central server can be further configured to determine, for each of the fluid flow systems, a predicted remaining capacity for the corresponding deionization tank system. In some examples, the predicted remaining capacity can be an amount of dissolved solids the system can subsequently remove from fluid flowing therethrough. Additionally or alternatively, the predicted remaining capacity can include a predicted time to exhaustion for the deionization tank system. This can be based, for example, on historic or predicted use data for the fluid flow system.

Based on the predicted remaining capacity for each of the deionization tank systems, the central server can generate a delivery schedule for servicing the deionization tank system for each of the plurality of service locations. In some examples, the delivery schedule can be generated based on a variety of additional parameters in addition to the predicted remaining capacity for each deionization tank system, such as delivery logistics. The delivery schedule can be optimized so that the delivery service expends the fewest resources while meeting the needs of each client.

In some embodiments, factors other than the predicted remaining capacity can contribute to a service location being placed on a delivery schedule. In some examples, a service location can request delivery, for example, using a network interface. In some examples, data corresponding to the amount and conductivity of the fluid such as conductivity data, fluid flow data, predicted remaining capacity of the deionization tank system, and the like are accessible by the user. A user may wish to manually request tank delivery based on observing such parameters. In some systems, additional sensors, such as a resistivity sensor positioned downstream of the deionization tank system, can provide information regarding the efficacy of the deionization tank system. In various such embodiments, if the deionization tank system is not operating sufficiently effectively (e.g., based on the data from such a sensor), tank delivery can be requested automatically and/or manually.

In some examples, the central server receives data corresponding to the amount and conductivity of the fluid flowing through the deionization tank system over time directly from network-connected fluid flow meters and conductivity sensors. Additionally or alternatively, one or more service locations can include a local controller in communication with the fluid flow meter and conductivity sensor at that service location. The local controller can receive fluid flow and conductivity data from the sensors and communicate the data to the central server and/or analyze the data, such as determine a predicted remaining capacity for the deionization tank system. Thus, in some such examples, the central server receives data corresponding to the amount and conductivity of fluid flowing through the system from the local controller. This can include fluid flow and conductivity data and/or a predicted remaining capacity of the deionization tank system corresponding to the amount and conductivity of the fluid flowing through the deionization tank system. Accordingly, in some such examples, determining a predicted remaining capacity for a deionization tank system by the central server comprises receiving the predicted remaining capacity for the deionization tank system from a corresponding local controller.

After generating a delivery schedule, the central server can communicate the delivery schedule to a distribution center, which can implement the delivery schedule and service the service locations. In some examples, the central server is in communication with a plurality of distribution centers, each distribution center being configured to service a different set of service locations. Thus, in some examples, the central server can generate a plurality of delivery schedules to provide service to different sets of service locations, for example, using different distribution centers.

DETAILED DESCRIPTION

Figure 1:
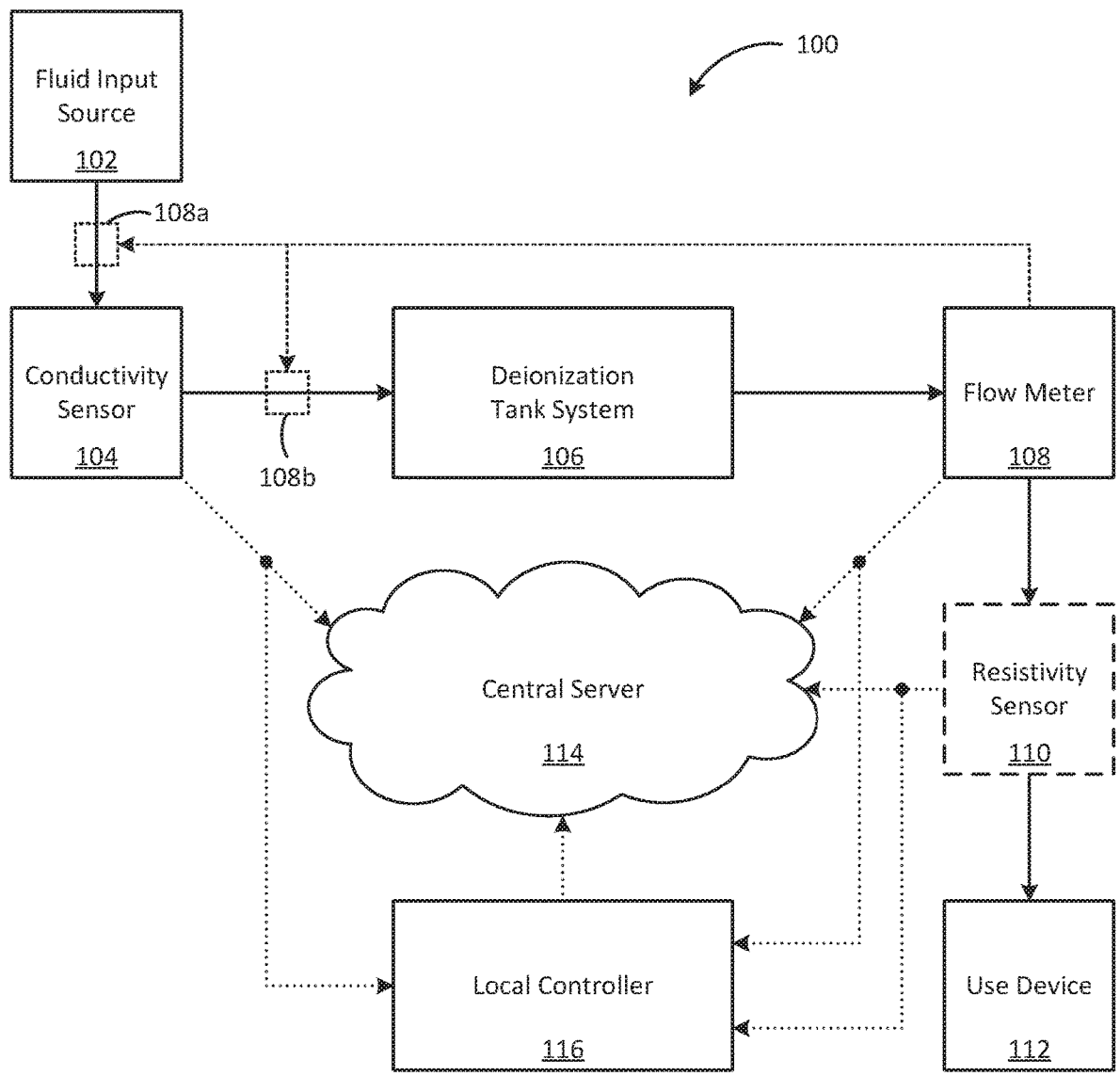
FIG. 1 is a schematic diagram illustrating aspects of an exemplary fluid pre-treatment system at a single location.

FIG. 1 is a schematic diagram illustrating aspects of an exemplary fluid pre-treatment system at a single location. The system includes a fluid input source 102 from which fluid enters the system for pre-treatment. The fluid flows to a deionization tank system 106 in order to treat the fluid to make the fluid suitable for an intended use. The deionized fluid is directed toward a use device 112 where the pre-treated fluid is suitable for use.

In various systems, a deionization tank system 106 includes one or more deionization tanks. Each tank can be one of a variety of types of tanks, including but not limited to strong based anion, weak based anion, cation, and mixed-bed tanks. Similarly, tanks can be a variety of sizes, for example, including different physical sizes, different amounts of deionizing material, and the like. A deionization tank system 106 can include one or more types of tanks within the system. The deionization tank system 106 is configured to deionize and/or perform an ion-exchange process on the fluid from the fluid input source 102 to render the fluid suitable for the end process of the use device 112.

In some exemplary systems, the deionization tank system 106 is configured to eliminate particulates or dissolved solids measured as TDS (total dissolved solids) from the fluid. In some instances, the service capacity of the deionization tank system 106 is measured in grains, which is approximately equal to the number of particles removed from the fluid by the deionization tank system 106. In some examples, the service capacity of the deionization tank system 106 is dependent upon the quality of the fluid flowing through the system and the consumption rate of the system, the type of tanks used in the system, the size of the tanks in the system, and the number of tanks in the system. In some such examples, the service capacity of a deionization tank system 106 can be known a priori based on various factors, such as a manufacturing process, quality of materials used, and historical utilization statistics.

Often, once a deionization tank system 106 has filtered its capacity of grains from the fluid, the deionization tank system 106 becomes exhausted. Once the deionization tank system 106 is exhausted, it is ineffective for deionizing the fluid or providing deionized fluid to the use device 112, and must be serviced or replaced. In some systems such as system 100, an exhausted deionization tank system 106 can result in a temporarily unusable use device 112 until the deionization tank system 106 is serviced or replaced.

In some embodiments, a fluid flow system can include a plurality of deionization tank systems (e.g., 106). Such a plurality of deionization tank systems can be arranged in series, parallel, or combination thereof. In some examples, two or more deionization tank systems are arranged in parallel and the fluid flow system further comprises a valve configured to selectively direct fluid through one of the deionization tank systems. Thus, in some such embodiments, when a deionization tank system (e.g., 106) is exhausted (or nearly exhausted), the valve can be actuated in order to divert the fluid flow to a different, less exhausted deionization tank system for continued operation of the fluid flow system. Additionally or alternatively, deionization tanks and/or deionization tank systems can be arranged in series. In some such examples, the most upstream deionization tank and/or tank system upstream will generally be subject to the largest deionization load, and may exhaust the soonest. In some such examples, the order of the serial deionization tanks and/or tank systems can be switched upon exhaustion (or near exhaustion) of one of the tanks and/or tank systems to reduce the load on the exhausted tank and/or system.

The system 100 of FIG. 1 includes a conductivity sensor 104 disposed upstream of the deionization tank system 106. The conductivity sensor is configured to generate a signal representative of the conductivity of the fluid flowing toward the deionization system. Any known types of conductivity sensor can be used, such as a toroidal sensor, a contact sensor, or the like. Additionally or alternatively, sensors from which a fluid conductivity can be determined and/or inferred may be used, such as resistivity sensors, total dissolved solid (TDS) sensors, or the like. For instance, in some examples, the conductivity sensor 104 is configured to determine the TDS content and/or the resistivity of the fluid flowing into the deionization tank system 106. In some such embodiments, such a sensor can be in communication with a processor (e.g., part of the central server 114 and/or the local controller 116) for determining a conductivity value based on a measured resistivity, TDS, or other associated value. Thus, as used herein, "conductivity sensor" can refer to any such sensors capable of providing measurement data from which a conductivity value can be determined. Exemplary conductivity sensors are described in U.S. patent application Ser. Nos. 14/166,513 and 14/535,523, each of which are assigned to the assignee of the instant application and are herein incorporated by reference in its entirety. Additionally or alternatively, in some embodiments, a "conductivity sensor" can comprise access to a database of data from which conductivity values can be determined. For example, in some embodiments in which the fluid flow system comprises using city water, published water quality data (e.g., including a concentration of a constituent) can be accessed and used to determine the conductivity of the water flowing into the system 100. A conductivity measurement of the fluid flowing into the deionization tank system 106 will provide knowledge regarding the load on the deionization tank system 106 to effectively deionize the fluid.

The system 100 of FIG. 1 further includes a flow meter 108 disposed between the output of the deionization tank system 106 and the use device 112. The flow meter 108 can be configured to output a signal representative of the rate of fluid flow through the deionization tank system 106 and to the use device 112. Data representative of the rate of flow over time can be analyzed to determine the total flow of fluid volume through the deionization tank system 106. Additionally or alternatively to measuring the flow rate of fluid, the flow meter 108 can be configured to directly measure the volumetric flow of fluid through the system. Exemplary flow meters are described in U.S. patent application Ser. No. 13/833,582, filed Mar. 15, 2013 and entitled FLUID FLOW METER, which is assigned to the assignee of the instant application and is hereby incorporated by reference in its entirety, though a variety of flow meters may be used. In some embodiments, the type of flow meter used may be selected based upon the fluid flowing through the fluid flow system to ensure that the flow meter is compatible with the fluid. Thus, in various embodiments, the total volume of the fluid flowing through the deionization tank system 106 can be determined via direct volumetric measurements and/or calculated via flow rate measurements.

While shown as being positioned downstream of the deionization tank system 106, in systems in which fluid from the fluid input source 102 flows continuously through the deionization tank system 106 and to the use device 112, the flow meter 108 could be positioned anywhere in the flow system 100. For instance, in some examples, the system can include a flow meter such as 108a positioned between the fluid input source 102 and the conductivity sensor 104 and/or such as 108b positioned between the conductivity sensor 104 and the deionization tank system 106. In various embodiments, one or more flow meters (e.g., 108, 108a, 108b) can be positioned at any of a variety of locations in the fluid flow system 100 at which the fluid will be flowing at approximately the same rate.

In some embodiments, a plurality of flow meters of different types can be positioned throughout the system (e.g., at 108, 108a, 108b). In some such embodiments, if a fluid flowing through the system 100 is incompatible with one of the flow meters (e.g., 108), a different flow meter (e.g., 108a) can be used to measure the flow rate of the fluid through the system 100. Different types of flow meters may be positioned at locations in the fluid flow system 100 based upon the type of flow meter. For example, certain flow meters may work better when positioned upstream of the deionization tank system 106 (e.g., at 108a or 108b) while other flow meters may work better when positioned downstream of the deionization tank system 106 (e.g., at 108).

In the illustrated embodiment the system 100 includes a resistivity sensor 110 positioned downstream of the deionization tank system 106. The resistivity sensor 110 can be configured to output a signal representative of the resistivity of the fluid flowing from the deionization tank system. The resistivity signal can be an indication of the quality of the fluid flowing from the deionization tank system 106 and/or of the operating quality of the deionization tank system 106. For example, a decrease in the resistivity of the fluid measured by the resistivity sensor 110 over time can be an indication of decreased deionization from the deionization tank system 106, as more ions in the fluid downstream of the deionization tank system 106 lowers the resistivity. In some examples, the resistivity sensor 110 can be used to ensure that the fluid flowing to the use device 112 is of sufficient quality. For instance, in some examples, a measured resistivity that is too low can indicate that the deionization tank system 106 needs repair or replacement.

As shown, the conductivity sensor 104, the flow meter 108, and the resistivity sensor 110 of the system 100 are in communication with a central server 114. The central server 114 can include a server in communication with components from a plurality of systems such as system 100. In some examples, the central server 114 can include the internet or other appropriate network for communicating data between a plurality of locations. For instance, in some embodiments, the central server 114 can be implemented as a cloud server or a distributed cloud computing environment.

In some embodiments, one or more sensors, (e.g., conductivity sensor 104, flow meter 108, and resistivity sensor 110) of the system 100 are capable of interfacing directly with the central server 114. Additionally or alternatively, one or more such sensors are in communication with a local controller 116. In various embodiments, local controller 116 can be configured to communicate data received from the one or more sensors to the central server 114, locally analyze data from the one or more sensors, and/or communicate results of local data analysis to the central server 114.

During exemplary operation, the outputs of various sensors can be analyzed to determine the number of grains filtered by the deionization tank system 106. For example, in some embodiments, the number of grains filtered by the tank system 106 is the product of the input water quality and the volumetric flow of the fluid through the system. For example, if the input water quality is measured in grains per volume, the product discussed above has the units [grains/volume]×[volume]=[grains], resulting in a calculation of total grains. In some examples, a dynamic determination of the filtered grains can be performed using an integral for accounting for variations in the flow rate and/or input fluid quality.

The number of grains filtered using the deionization tank system 106 can be used with the initial capacity of the deionization tank system 106 to determine the remaining capacity of the system. For instance, in an exemplary implementation, the remaining capacity of the deionization tank system 106 can be calculated using equation (1) below $$C(t')=C(0)-\int_0^{t'} K(t)\cdot F(t)dt \qquad (1)$$

where:
C(t') is the capacity of the tank system at a given time (t')
C(0) is the initial capacity of the tank system
K(t) is the conductivity of the fluid at the inlet of the tank system as a function of time
F(t) is the flow rate of the water on the inlet or outlet of the tank system as a function of time.

In some examples, C(t) is a measure of capacity in grains or other units of solids dissolved in the fluid and filtered by the system. In some examples, the remaining capacity can be used to predict a time to exhaustion for the deionization tank system 106. For example, the average amount of TDS removed from the fluid stream over a given time period (e.g., week, day, hour, etc.) can be used to determine the number of such discrete time periods remaining until the deionization tank system 106 is exhausted. For instance, in an exemplary calculation, a deionization tank system 106 has a remaining capacity of X grains, and on average, the deionization tank system 106 filters Y grains per day from the fluid flowing through the system 100. Then the predicted time until exhaustion ($t_e$) in days for the deionization tank system 106 can be calculated using equation (2) below $$t_e = \frac{X \text{ grains remaining}}{Y \text{ grains/day}} \qquad (2)$$

It will be appreciated that similar calculations are possible using different units, such as different measurements of TDS and/or different time intervals. In some examples, historic data for TDS filtering over periods of time can be used to predict the time until exhaustion. In various examples, historic data can include one or more calculations of an amount of TDS filtered from a deionization tank system. For instance, the amount of TDS filtered from the fluid over a time t' can be calculated using the integral term from equation 1 above. One or more such calculated times can be averaged to determine an average TDS filtering rate. Additionally or alternatively, historic data can include time of use statistics, such as time of day, day of the week, etc. Thus, for instance, some such systems that typically run on weekdays and calculate a time to exhaustion in days may exclude weekends from the predicted number of days until exhaustion or in determining a predicted exhaustion date.

In some examples, calculations such as those described can be performed locally, for example, by the local controller 116 in wired or wireless communication with the variety of sensors. Additionally or alternatively, the sensors can be in wired or wireless communication with the central server 114, which can facilitate remote or cloud-based calculations and analysis. In some examples, one or more calculations can be performed at the local controller 116 and the results of such calculations be communicated to the central server 114. In still further examples, raw data from system sensors (e.g., conductivity sensor 104, flow meter 108, etc.) can be communicated to the local controller 116 via wired or wireless communication. The local controller can be configured to communicate the data to the central server 114 for analysis/calculations. Accordingly, in any such embodiment, the central server 114 can receive and/or determine a remaining capacity and/or a predicted exhaustion time of a deionization tank system 106 in a fluid flow system 100.

In some embodiments, data that is measured and/or determined can be accessible by a system operator/technician via an interface. For example, conductivity data, flow data, remaining tank capacity, predicted time to exhaustion or exhaustion date, and the like can be accessed via a system operator for performing system analysis. In various examples, such data may be accessible via a network such as the internet using a computer, smartphone, tablet, or the like. The interface by which the user observes the data can include a website, an application ("app") or the like. Such data provides the system operator with detailed information regarding the fluid flow system 100. Such data can be made accessible locally, for example, via a local controller 116 publishing data regarding the local data. Additionally or alternatively, such data can be made accessible by the central server 114. In some such examples, a system operator can log in to the central server 114 in order to view data specific to that user.

Additionally or alternatively, in some examples, data can be communicated to a user (e.g., from the local controller 116 and/or the central server 114) in the form of an alert. For example, in various embodiments, if one or more parameters (e.g., the remaining tank capacity, the predicted time to exhaustion, conductivity data, flow data, resistivity data, etc.) satisfy a predetermined condition, a user can be alerted of such condition(s). Alerts can be communicated in a variety of ways, such as through a dedicated flow-system alert device (e.g., an audible and/or visible alarm) and/or a system operator's device (e.g., computer, phone, etc.). In some embodiments, an alert comprises an indication that the tank system (e.g., 106) requires servicing.

Figure 2:
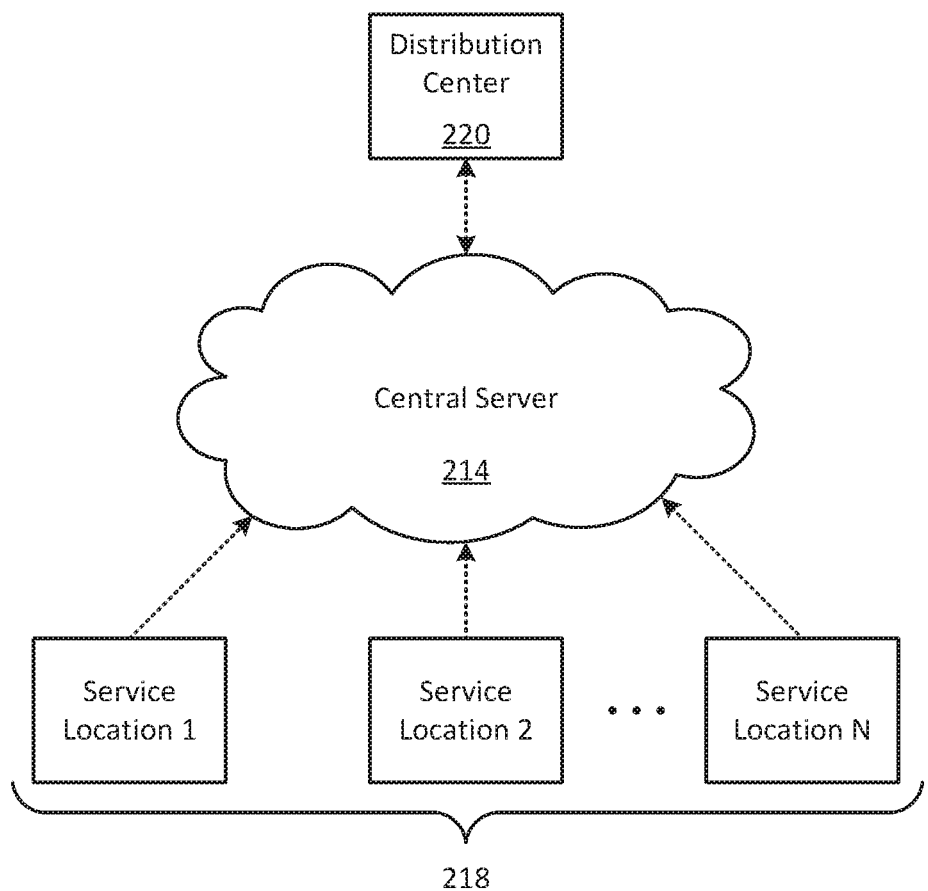
FIG. 2 is a schematic illustration of a central server in communication with a plurality of service locations.

In some examples, the central server can be in communication with a plurality of fluid flow systems, for example, at a plurality of locations. FIG. 2 is a schematic illustration of a central server in communication with a plurality of service locations. As shown, central server 2014 is in communication with a plurality of service locations 218. In the illustrated example, the central server 214 is in communication with N service locations 218. In various embodiments, each service location 218 can include one or more fluid flow systems such as the system 100 shown in FIG. 1. As described with respect to FIG. 1, sensors of such fluid flow systems, such as conductivity sensors, flow meters, and the like, can be in communication with the central server 214 via any of a variety of ways, such as via wired or wireless communication or via a local controller at the service location 218. For each fluid flow system at each of the service locations 218, the central server 214 can receive or otherwise determine a predicted remaining capacity and/or time to exhaustion for deionization tank systems associated with such fluid flow systems.

In the illustrated embodiment, central server 214 is additionally in communication with a distribution center 220. The distribution center 220 can be equipped to service or replace deionization tank systems at the service locations 218. In some such examples, distribution center 220 can receive information from the central server 214 regarding the status of deionization tank systems at service locations 218. For instance, in some examples, the distribution center 220 can receive information regarding the remaining capacity or predicted time to exhaustion for deionization tank systems at the service locations 218. In some embodiments, the distribution center 220 receives such information from the central server 214. Additionally or alternatively, the distribution center 220 can receive sensor and location data from each of the service locations 218 via the central server 214, and subsequently determine deionization tank system information, such as remaining capacity or predicted time to exhaustion. For instance, the distribution center 220 receives data from a conductivity sensor and a flow meter from service location 1 via central server 214, as well as location identification information to indicate to the distribution center 220 that the information is associated with sensors at service location 1. In some such examples, the distribution center 220 is capable of performing calculations to determine, for instance, the remaining capacity or predicted time until exhaustion for a deionization tank system at service location 1.

Whether deionization tank system information (e.g., remaining capacity, predicted time until exhaustion, etc.) is determined via a local controller at a service location 218, determined via the central server 214 (e.g., via cloud-based computing), or at the distribution center 220, such information can be used to determine actions to be taken by the distribution center 220. For example, information regarding predicted times until exhaustion for a plurality of service locations 218 can be used to prioritize delivery and/or service to such locations 218 from the distribution center 220.

In an exemplary embodiment, the central server 214 is configured to receive data from a plurality of sensors (e.g., flow meter, conductivity sensor, etc.) arranged in a fluid flow system such as system 100 of FIG. 1 from each of a plurality of service locations 218. For instance, the plurality of sensors at the plurality of service locations 218 can include deployed as an Internet-of-Things (IoT) based sensor system coupled to a cloud-based central server 214. Data received by the central server 214 can include fluid data (e.g., flow rate, conductivity, etc.) as well as location identification information providing details to the central server 214 regarding with which of the plurality of service locations 218 the fluid data is associated. The central server 214 can perform analysis on the received data to determine a predicted time to exhaustion for deionization tank systems at each of the plurality of service locations 218. As described elsewhere herein, in various embodiments, such analysis can include calculation of various parameters (e.g., via equations 1 and 2) as well as predictive analytics, such as based on historical data and the like.

The central server 214 can use the plurality of predicted times to exhaustion for the deionization tank systems at the plurality of service locations 218 alone or in combination with a variety of other parameters to generate a delivery schedule for the distribution center 220. It will be appreciated that, while referred to as a "delivery schedule," such a schedule need not include delivery of a physical item. For instance, in a variety of embodiments, an entry in a delivery schedule can include the delivery of a replacement deionization tank or deionization tank system, removal of a deionization tank or deionization tank system, on-site servicing of a deionization tank or deionization tank system (e.g., regenerating deionization equipment), and/or any combinations thereof. The delivery schedule can be carried out by the distribution center 220 in order to service each service location 218 in an efficient manner while providing adequate service to each service location 218. In various embodiments, a variety of input parameters may be considered when generating such a delivery schedule. Some such parameters can include, but are not limited to:

- The predicted time until exhaustion of a deionization tank system—deionization tank systems with later predicted times until exhaustion may be placed later on the delivery schedule or included in a separate, later delivery.
- Service agreements with one or more service locations 218—in some cases, the system service provider (e.g., the distribution center 220) has a contractual agreement with a service location 218 to provide deionization tank system replacement/service prior to exhaustion or within a specified time after exhaustion occurs.
- Physical locations of service locations 218—delivery routes can be optimized to minimize backtracking, left-hand turns, and/or other inefficiencies in travel routes. This can minimize time and/or fuel required to execute the delivery schedule.
- Capacity of the delivery vehicle—schedules can be based on a series of delivery routes between which the delivery vehicle must return to the distribution center to reload new deliverables due to finite capacity of the delivery vehicle.
- Fuel cost—if fuel cost is low, delivery schedules may be generated to favor other factors (e.g., time, number of separate delivery trips, etc.) while minimizing the importance of fuel efficiency. In other instances, high fuel costs may result in prioritized fuel efficiency parameters (e.g., shorter travel distances, etc.).
- Fuel efficiency of the delivery vehicle—similarly, a more fuel efficient vehicle may minimize the importance of fuel efficiency in the delivery schedule itself.
- Average time spent at each service location 218—different estimated amounts of time required to service and/or replace deionization tank systems can determine the number of service locations that can be serviced in a particular time window.
- Hours of operation of each service location 218—depending on the service location, it can be advantageous to arrive at the service location during hours of operation (e.g., if outside of such hours, important personnel are not available) or outside of the hours of operation (e.g., if the deionization tank system must be running during the hours of operation).
- Regulator factors—regulations such as those placed on the amount of time spent behind the wheel by a delivery truck driver (e.g., weekly and/or daily restrictions) can be used to schedule deliveries by certain personnel.
- Physical factors of delivery tanks—shape, capacity, dimensions, and weight are exemplary constraints that may impact the number and/or type of tanks that can be delivered on a single truck, for example.
- Service location requests—in some instances, service locations are provided with a tank request capability by which the service location can requests tank delivery at a different time than would be indicated using a predicted time to exhaustion.

Generating a delivery schedule based on such parameters can help ensure that the service provider meets contractual obligations to the service locations 218 while minimizing operating costs. In some implementations, some of the input parameters for generating the delivery schedule can be input to the central server via the distribution center 220. That is, the service provider operating the distribution center can continue to adjust such input parameters as necessary.

Additionally or alternatively, in some embodiments, a service location 218 includes an interface by which the service location 218 can request a delivery regardless of the predicted time to exhaustion associated with the facility. For instance, in an exemplary embodiment, a system operator at a service location 218 observes (e.g., via an app on the operator's smart device) a predicted remaining tank capacity that will be insufficient for a particular upcoming task. In some such embodiments, the system operator may request tank delivery earlier than would normally be dictated via the traditional schedule generation procedures.

In an exemplary embodiment, a service location 218 includes an interface device in communication with the central server 214. In some such embodiments, a system operator can request tank delivery using the interface device. In some examples, interface device can be a network communication device such as a computer, smartphone, tablet, or the like. In some such examples, a web interface (e.g., a website) or app can provide such tank delivery request functionality. For example, the interface device provides an interface such as a selectable button or the like which, when selected by the user, initiates a tank delivery request from the service location 218 to the central server 214. In some examples, the web interface or application can be the same interface for providing the system operator with various data regarding the fluid flow system. For example, in some embodiments, a user can view data regarding the fluid flow system using the interface device, such as data regarding the remaining tank capacity or a predicted time to exhaustion, and request delivery using the same interface device. Additionally or alternatively, the interface device can include a network-connected actuator, such as a button or switch that can be actuated by a user in order to request tank delivery.

As described elsewhere herein, in some embodiments, a system can alert a user that a deionization tank system is exhausted and/or is nearing exhaustion (e.g., the central server and/or a local controller). In response to the alert, the user may request tank replacement such as is described above. For example, in an exemplary embodiment, a system operator can receive data indicating that a deionization tank system is near exhaustion via an app/web interface. In response, the system operator may use the same app/web interface to request tank delivery. In other examples, the alert and request may be performed using different devices. For instance, an alert may comprise a visible and/or audible alarm that a tank is approaching exhaustion, and the system operator may, in response, request a tank delivery via the interne or telephone.

In some such embodiments, the delivery request by the user is received by the central server 214 to indicate to add the corresponding service location 218 to a delivery schedule. The Various parameters, such as those listed above, can be used to determine an efficient place (e.g., order, timing, etc.) in the delivery schedule to schedule the requested delivery.

As described elsewhere herein, in some embodiments, a resistivity sensor (e.g., 110 in FIG. 1) can be positioned downstream of the deionization tank system 106 for monitoring the fluid quality exiting the deionization tank system 106. In some cases, resistivity data from the resistivity sensor can be provided to the central server to indicate if tank exhaustion occurs. For example, in the event of unexpected tank exhaustion, the deionization tank system 106 will fail to treat the fluid effectively, which manifests as a change in the detected resistivity data at the output of the deionization tank system 106. In some embodiments, such a detected change can trigger an automated request for tank delivery. Such an automated request may be treated similarly to a manual delivery request, in which the service location 218 is added to the delivery schedule.

As described elsewhere herein, in some examples, a corrective action can be performed in response to a certain predicted time to exhaustion condition. For example, in the event that a predicted time to exhaustion for a first deionization tank system satisfies a predetermined threshold, a valve can be actuated to divert fluid flow from the deionization tank system to a different deionization tank system arranged in parallel with the first. In some embodiments, such switching can be done automatically based on a control command from a central server, local controller, or other device capable of analyzing the predicted time to exhaustion for the deionization tank system and communicating with the valve. Additionally or alternatively, in some examples, such a valve may be actuated by a system operator (e.g., via an interface device) in response to received data, such as predicted time to exhaustion and/or remaining capacity data.

In some examples, actuating the valve to switch from using one deionization tank system to another corresponds to a requested tank replacement. For instance, in some embodiments, a manual or automated switching from one deionization tank system to another triggers an automated request for deionization tank system replacement. Additionally or alternatively, a manual or automated request for tank replacement can trigger an automated switching from one deionization tank system to another.

It will be appreciated that, while in some of the foregoing examples, the central server 214 received data from sensors at service locations 218 in an IoT implementation and generated the delivery schedule, other configurations are possible. For example, as described elsewhere herein, data from the sensors at one or more of service locations 218 can be communicated to the central server 214 via a local controller located at the service location 218. Additionally or alternatively, various calculations and/or predictions can be performed by such a local controller and communicated to the central server 214 for the generation of the delivery schedule. In still further embodiments, the central server 214 can facilitate communication of raw data (e.g., from the plurality of sensors in a deionization tank system) and/or calculated/predicted parameters (e.g., remaining deionization tank system capacity and/or predicted time to exhaustion) to the distribution center 220 for subsequent processing. For instance, in some such embodiments, the distribution center 220 may be capable of performing such calculations/predictions and/or generating such a delivery schedule.

Figure 3:
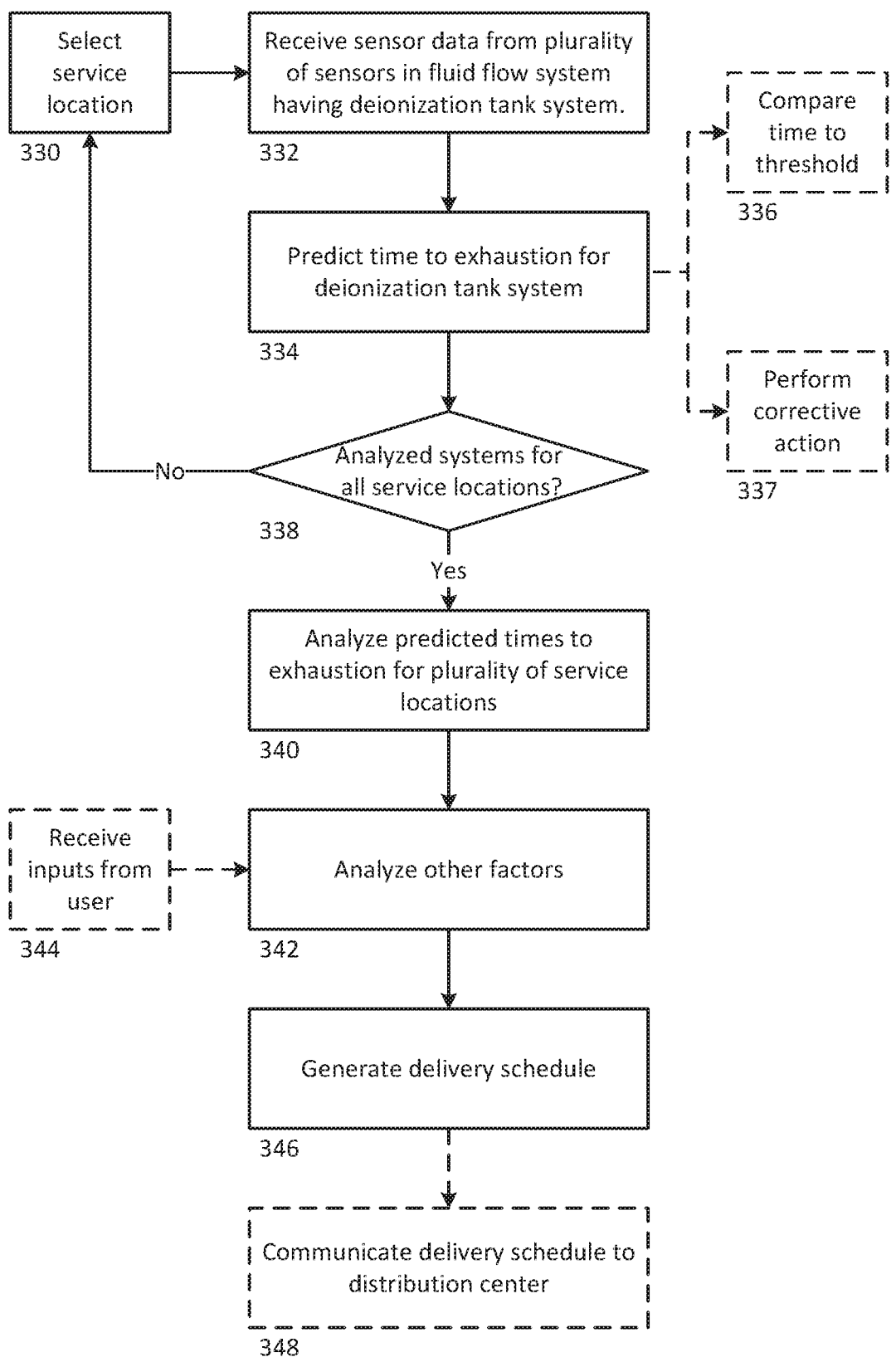
FIG. 3 is a process flow diagram illustrating an exemplary method for generating a delivery schedule for a plurality of service locations.

FIG. 3 is a process flow diagram illustrating an exemplary method for generating a delivery schedule for a plurality of service locations. According to the exemplary method of FIG. 3, for a selected service location (330), sensor data from a plurality of sensors in a fluid flow system having a deionization tank system is received (332). As discussed elsewhere herein, sensor data can include data from a conductivity sensor positioned upstream from the deionization tank system and a flow sensor in the fluid flow path. The method further includes predicting the time to exhaustion for the deionization tank system (334). This can be performed as described elsewhere herein, for example, using equations (1) and (2), as well as historical data.

In some examples, an optional step of comparing the predicted time to exhaustion to a threshold (336) can be performed. In some such examples, if the predicted time to exhaustion exceeds the threshold, the service location corresponding to the deionization tank system is not added to a delivery schedule. That is, in some embodiments, delivery schedules are created only including service locations having deionization tank systems predicted to become exhausted within a certain amount of time. This can enable further monitoring of systems that are not predicted to soon become exhausted so that the predicted time to exhaustion can be updated as needed.

Additionally or alternatively, the method can include the step of performing a corrective action (337). In some examples, such corrective action is performed if the predicted time to exhaustion for the deionization tank system meets a predetermined condition (e.g., is less than a predetermined threshold). For example, as described elsewhere herein, in some embodiments, fluid flow systems can include a plurality of deionization tank systems arranged in series and/or parallel with one another and a valve for switching the fluid flow path between such systems. In some such embodiments, a corrective action can include adjusting the valve to divert the fluid flow from one deionization tank system to another. For example, in some embodiments, if a deionization tank system is predicted to be nearly exhausted, the step of performing the corrective action (337) can include diverting fluid flow from the nearly exhausted deionization tank system to a different, non-exhausted deionization tanks system arranged in parallel with the nearly exhausted system.

After predicting the time to exhaustion for a deionization tank system (334) if deionization tank systems for all service locations have not been analyzed (338), a new service location can be selected (330) and corresponding deionization tank systems analyzed. This ensures that no service locations are omitted from the analysis and are not mistakenly left off of a delivery schedule. In some examples, service locations having deionization tank systems having a predicted time to exhaustion that exceeds a threshold are excluded from analysis, and may be excluded from subsequent analysis until the predicted time to exhaustion is within the threshold.

Once times to exhaustion for deionization tank systems for desired service locations are predicted, such predicted times can be analyzed (340). Additionally, other factors such as those described elsewhere herein can be analyzed as well (342). In some examples, other factors can be based on inputs received by a user (344), such as variable inputs which may be subject to change. Once such factors have been analyzed (e.g., in steps 340, 342), a delivery schedule can be generated (346). In some embodiments, depending on where the delivery schedule is generated (e.g., via a central server, at a distribution center, etc.), the delivery schedule can be communicated to the distribution center (348) for implementation.

As described elsewhere herein, the delivery schedule can be generated to maximize efficiency and/or profitability for the distribution center. The predicted times to exhaustion for a plurality of deionization tank systems at a plurality of service locations coupled with other factors such as those described elsewhere herein can be analyzed together to generate a delivery schedule. A distribution center (e.g., 220) can then operate according to the delivery schedule to fulfil service requirements to service locations (e.g., 218) while maximizing profitability.

Optimization of the delivery schedule based on predictive analytics can enable a service model that will enable the optimal utilization of a tank system. In some such examples, the capacity of a deionization tank system can be maximized such that the deionization tank system is serviced/replaced just in time before it runs out of capacity. Additionally or alternatively, optimized delivery schedules can enable the service provider (e.g., at distribution center 220) to meet the terms of service in the contract by replacing the tanks within the time window of delivery and guarantees of continuity of service, etc. provided in the contractual agreements to the customers at the service locations. The optimal scheduling of deionization tank system service/replacement can minimize operating costs such as cost of delivery, optimal utilization of capacity of the delivery vehicle, maximizing efficiency, etc.

Figure 4:
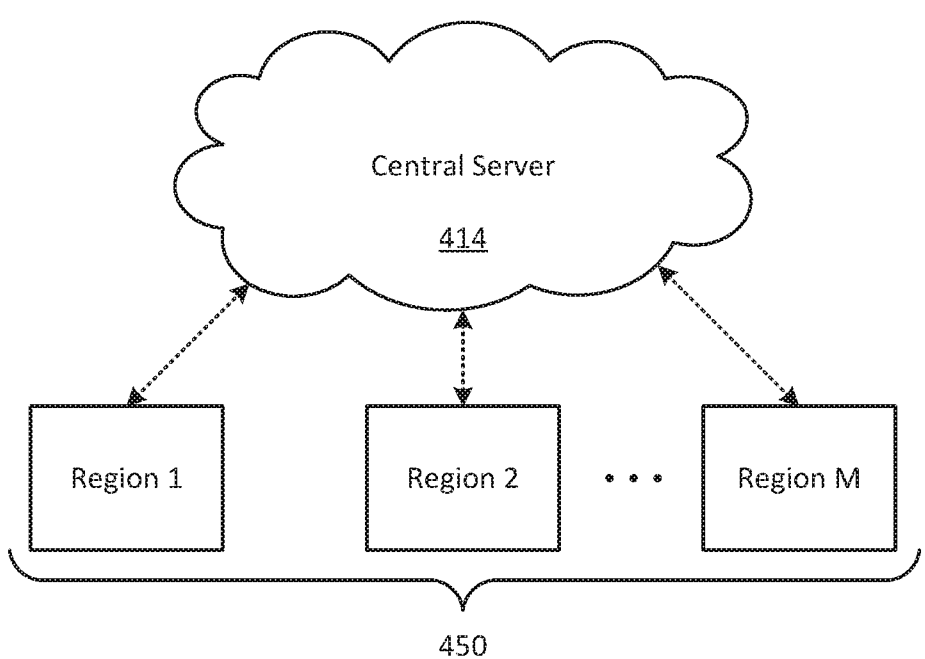
FIG. 4 is a schematic illustration of a central server in communication with a plurality of regions.

In some examples, it may be impractical for a single distribution center (e.g., 220) to service all service locations (e.g., 218). Thus, in some examples, a plurality of distribution centers may be operational to service such a plurality of service locations. In some such examples, each distribution center (e.g., 220) can be responsible for providing service to the service locations (e.g., 218) in a particular region. FIG. 4 is a schematic illustration of a central server in communication with a plurality of regions. In the illustrated configuration, central server 414 is in communication with M regions 450 (Region 1, Region 2 . . . Region M). In an exemplary embodiment, each region includes one or more distribution centers (e.g., 220) for servicing a plurality of service locations (e.g., 218) in its corresponding region. In some such examples, distribution centers and/or service locations may belong to one or more such regions 450 such. In some such examples, delivery schedules are generated to determine how to distribute such service locations among corresponding distribution centers most efficiently. That is, in some examples, a particular service location may be placed on a delivery schedule for different distribution centers based on a variety of factors that go into generating the schedule.

In an exemplary embodiment, the central server (e.g., 414) facilitates an Internet-of-Things (IoT) system in wired or wireless communication with a plurality of sensors (e.g., conductivity sensors 104, flow meters 108, etc.) in a fluid flow system (e.g., 100) with a deionization tank system (e.g., 106) in a plurality of service locations (e.g., 218). The central server (e.g., 114) can receive information from the sensors and additional information from a system operator (e.g., at a service location 218). Based on the received information, the central server can perform predictive analytics as discussed elsewhere herein to predict exhaustion times of various deionization tank systems and generate a delivery schedule to be implemented by a distribution center (e.g., 220) for servicing/replacing deionization tank systems at the service locations. As described with respect to FIG. 4, in some examples, the central server is capable of identifying a plurality of regions (e.g., 450) associated with different distribution centers. In some such examples, the central server is configured to generate separate delivery schedules for each distribution center for servicing its respective region.

Figure 5:
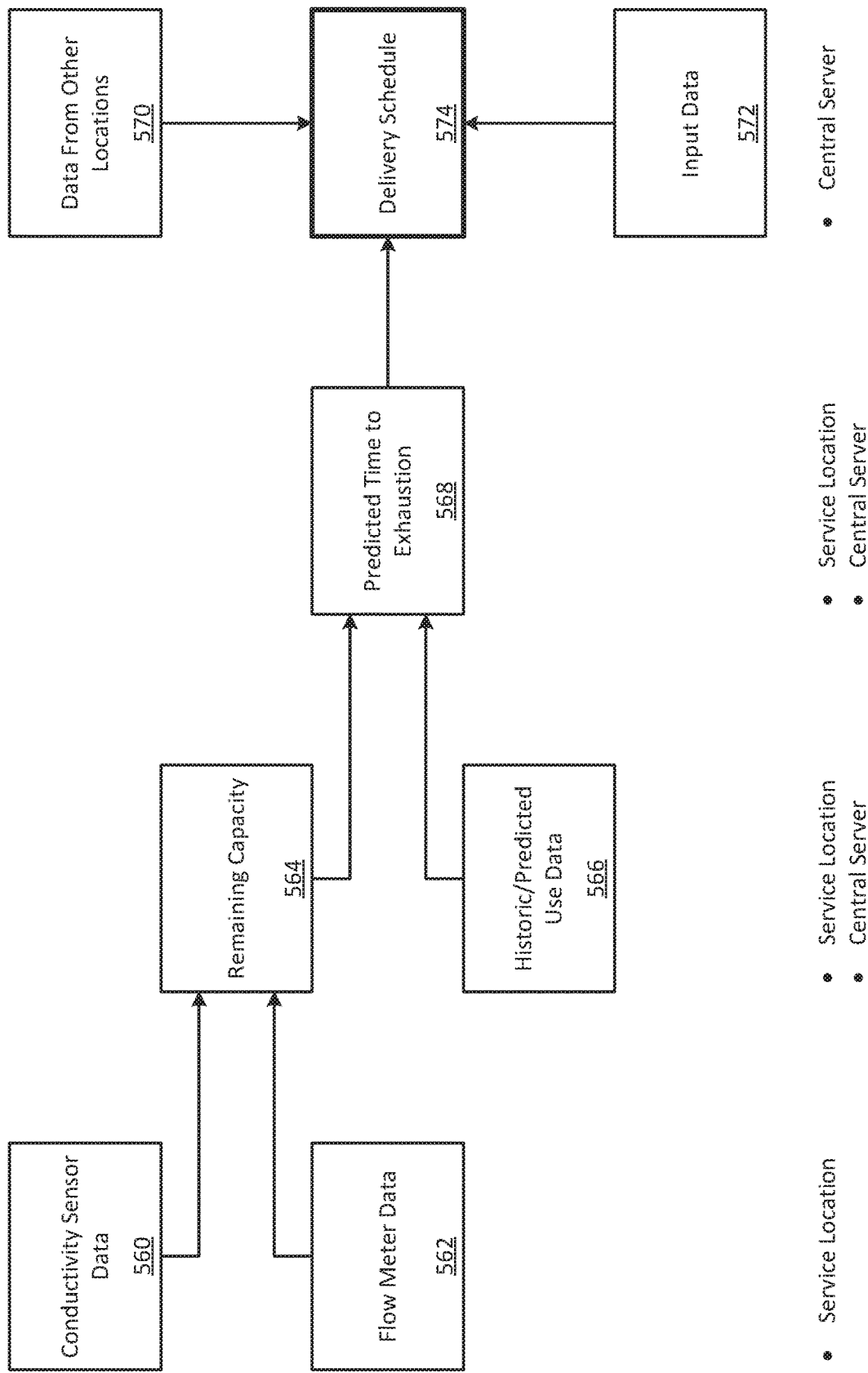
FIG. 5 is a flow diagram illustrating a process for generating a delivery schedule.

As described elsewhere herein, various determinations and calculations can be performed at a variety of locations in various implementations of such systems. FIG. 5 is a flow diagram illustrating a process for generating a delivery schedule. In the illustrated embodiment conductivity sensor data 560 and flow meter data 562 are obtained from such sensors positioned in a fluid flow system at a service location. The conductivity sensor data 560 and the flow meter data 562 can be combined as described elsewhere herein to determine a remaining capacity 564 of a deionization tank system in the fluid flow system. In various embodiments, this determination can be performed at the service location or via a central server.

The remaining capacity of the deionization tank system can be used in conjunction with historic and/or predicted use data 566 of the deionization tank system to predict the time to exhaustion 568 for the deionization tank system. The historic and/or predicted use data 566 can be recalled and/or determined at the service location and/or the central server. Similarly, the predicted time to exhaustion 568 for the deionization tank system at the service location can be determined at the service location or via the central server.

As discussed elsewhere herein, the predicted time to exhaustion 568 can be coupled with similar data from other service locations 570 and other input data 572 (e.g., variable and/or adjustable parameters) to generate a delivery schedule 574. As discussed elsewhere herein, the central server can be a cloud based server or can be positioned in a central location such as a distribution center. While the delivery schedule 574 is typically generated via the central server in communication with a plurality of service locations, in some examples, a delivery schedule for a service location may be generated at the service location itself. For example, in a delivery network having very few or infrequent deliveries or other situations in which the service location can effectively request delivery, a delivery schedule can be generated by the service location indicating a requested time for delivery.

In some examples, various aspects of the features described herein can be embodied in a non-transitory computer-readable medium comprising executable instructions for causing a programmable processor to carry out various processes. For instance, the non-transitory computer-readable medium can include instructions for receiving sensor data (e.g., conductivity data, flow data, etc.) associated with fluid flow systems at one or more service locations and determine a remaining capacity of the deionization tank system in the associated fluid flow system. Additionally or alternatively, a non-transitory computer-readable medium can include instructions for predicting the time to exhaustion for such deionization tank systems, for example, based a remaining capacity and historical use data. The non-transitory computer-readable medium can include instructions for generating a delivery schedule, for example, via processed described elsewhere herein. Exemplary non-transitory computer-readable media can be operate locally, such as at a service location or a distribution center, or may be remotely located, for example, operating via a cloud-based IoT network.

Various embodiments have been described. Such examples are non-limiting, and do not define or limit the scope of the invention in any way. Rather, these and other examples are within the scope of the following claims.

The invention claimed is:

1. A system for generating delivery schedules for servicing deionization tanks located at a plurality of service locations, the system comprising:
at each of the plurality of service locations, a fluid flow system comprising:
a deionization tank system having a fluid inlet and a fluid outlet, the deionization tank system having a capacity, the capacity being an amount of dissolved solids the deionization tank system can remove from fluid flowing therethrough;
a fluid flow meter positioned in the fluid flow path either upstream or downstream of the deionization tank system;
a conductivity sensor positioned in the fluid flow path upstream from the deionization tank system, the conductivity sensor being in fluid communication with the fluid inlet of the deionization tank system; and
a central server in communication with each of the plurality of service locations, the central server being configured to:
receive, from each service location, data corresponding to the amount and conductivity of the fluid flowing through the deionization tank system over time;
predict, for each of the fluid flow systems, a remaining amount of the capacity of the deionization tank system, the predicted remaining amount of the capacity corresponding to an amount of dissolved solids the deionization tank system can subsequently remove from the fluid flowing therethrough and being based on the received data corresponding to the amount and conductivity of the fluid flowing through the deionization tank system; and
generate a delivery schedule for servicing deionization tank systems for each of the plurality of service locations based on the predicted remaining amount of the capacity for each of the deionization tanks at the plurality of service locations.

2. The system of claim 1, wherein the remaining capacity comprises a time to exhaustion.

3. The system of claim 1 wherein central server receives location information associated with the conductivity and fluid flow data received from each service location associated.

4. The system of claim 1, wherein the central server is located at a distribution center capable of implementing the generated delivery schedule.

5. The system of claim 1, wherein the central server is a cloud-based server.

6. The system of claim 5, wherein the flow meter and conductivity sensor at each of the plurality of locations are in communication with the cloud-based central server and form an Internet-of-Things (IoT) based sensor system.

7. The system of claim 6, wherein the cloud-based central server is configured to perform predictive analytics based on previously received data in order to predict the time to exhaustion for each fluid flow system.

8. The system of claim 1, further comprising a user interface in communication with the central server, and generating the delivery schedule for servicing deionization tank systems is further based on data input via the user interface.

9. The system of claim 8, wherein the generated delivery schedule is based on the predicted remaining capacity for each of the deionization tank systems at the plurality of service locations and one or more items from the list consisting of: fuel cost, fuel efficiency of a delivery vehicle, capacity of the delivery vehicle, physical locations of one or more service locations, and the hours of operation of one or more service locations.

10. The system of claim 1, wherein the fluid flow system of at least one of the plurality of service locations further comprises a resistivity sensor positioned downstream of the deionization tank system and configured to generate resistivity data representative of the quality of the fluid flowing from the deionization tank system.

11. The system of claim 10, wherein
the central server is further configured to receive, from each such service location, resistivity data representative of the quality of the fluid flowing from the deionization tank system; and
in the event that the resistivity data representative from a service location satisfies a predetermined condition, the central server adds the service location to the delivery schedule.

12. The system of claim 1, wherein at least one fluid flow system at one of the service locations includes a local controller in communication with the fluid flow meter and the conductivity sensor at the service location and configured to communicate data corresponding to the amount and the conductivity of the fluid flowing through the fluid deionization system over time to the central server.

13. The system of claim 12, wherein determining, for each of the fluid flow systems, a predicted remaining capacity for the deionization tank system comprises receiving a predicted remaining capacity from one or more local controllers.

14. A method for generating a delivery schedule for servicing deionization tank systems at a plurality of service locations comprising:
for each of the plurality of service locations:
receiving conductivity data representing the conductivity of a fluid flowing through a fluid flow system upstream from a deionization tank system;
receiving fluid flow data representing the amount of fluid flowing through the deionization tank system, the deionization tank system having a capacity, the capacity being an amount of dissolved solids the deionization tank system can remove from fluid flowing therethrough;
calculating a remaining amount of the capacity of the deionization tank system based on the received conductivity data and fluid flow data system, the remaining amount of the capacity for the deionization tank system corresponding to an amount of dissolved solids the deionization tank system can subsequently remove from fluid flowing therethrough; and
predicting a time to exhaustion for the deionization tank system in the fluid flow system based on the calculated remaining amount of the capacity for the deionization tank system; and
generating a delivery schedule for servicing the deionization tank systems at the plurality of service locations based on the predicted times to exhaustion for the deionization tank systems at the plurality of service locations.

15. A non-transitory computer-readable medium comprising executable instructions for causing a programmable processor to perform a method comprising:
(a) receiving conductivity data representative of the conductivity of a fluid in a fluid flow system flowing toward a deionization tank system, the deionization tank system having a capacity, the capacity being an amount of dissolved solids the deionization tank system can remove from fluid flowing therethrough;

(b) receiving fluid flow data representative of the conductivity of the fluid in the fluid flow system;

(c) calculating a remaining amount of the capacity of the deionization tank system based on the received conductivity data and fluid flow data, the remaining amount of the capacity for the deionization tank system corresponding to an amount of dissolved solids the deionization tank system can subsequently remove from fluid flowing therethrough; and (d) predicting the time to exhaustion of the deionization tank system based on the calculated remaining amount of the capacity of the deionization tank system;

repeating steps (a)-(d) for each of a plurality of fluid flow systems located at a plurality of service locations; and (e) generating a delivery schedule for servicing the plurality of service locations based on the predicted times to exhaustion for the deionization tank systems at the plurality of locations.

16. The method of claim 14, wherein the predicting the time to exhaustion for the deionization tank system at each of the plurality of locations is based on historic use data of the deionization tank system.

17. The method of claim 14, further comprising receiving one or more input parameters, and wherein the generating the delivery schedule is further based on the received one or more input parameters.

18. The method of claim 17, wherein the one or more input parameters comprises one or more parameters from the list consisting of: fuel cost, fuel efficiency of a delivery vehicle, capacity of the delivery vehicle, physical locations of one or more service locations, and the hours of operation of one or more service locations.

19. The method of claim 14, wherein the receiving the conductivity data, the receiving the fluid flow data, the predicting the time to exhaustion, and the generating the delivery schedule are performed by a cloud-based server.

20. The non-transitory computer-readable medium of claim 15, wherein:

the method further comprises receiving one or more input parameters from the list consisting of fuel cost, fuel efficiency of a delivery vehicle, capacity of the delivery vehicle, physical locations of one or more service locations, and the hours of operation of one or more service locations; and generating the delivery schedule is based on the predicted times to exhaustion for the deionization tank systems and the received one or more input parameters.

* * * * *

UNITED STATES PATENT AND TRADEMARK OFFICE
CERTIFICATE OF CORRECTION

PATENT NO. : 11,017,344 B2
APPLICATION NO. : 15/262832
DATED : May 25, 2021
INVENTOR(S) : Ashish Agarwal et al.

Page 1 of 1

It is certified that error appears in the above-identified patent and that said Letters Patent is hereby corrected as shown below:

On the Title Page

Item [74], delete "Fredikson" and insert -- Fredrikson --

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*